US011727645B2

(12) United States Patent
De La Riviere et al.

(10) Patent No.: US 11,727,645 B2
(45) Date of Patent: Aug. 15, 2023

(54) DEVICE AND METHOD FOR SHARING AN IMMERSION IN A VIRTUAL ENVIRONMENT

(71) Applicant: IMMERSION, Bordeaux (FR)

(72) Inventors: Jean-Baptiste De La Riviere, Bordeaux (FR); Valentin Logeais, Bordeaux (FR); Cédric Kervegant, Le Bouscat (FR)

(73) Assignee: IMMERSION, Bordeaux (FR)

(*) Notice: Subject to any disclaimer, the term of this patent is extended or adjusted under 35 U.S.C. 154(b) by 0 days.

(21) Appl. No.: 16/096,906

(22) PCT Filed: Apr. 27, 2017

(86) PCT No.: PCT/FR2017/051004
§ 371 (c)(1),
(2) Date: Oct. 26, 2018

(87) PCT Pub. No.: WO2017/187095
PCT Pub. Date: Nov. 2, 2017

(65) Prior Publication Data
US 2019/0139313 A1 May 9, 2019

(30) Foreign Application Priority Data

Apr. 27, 2016 (FR) ...................................... 1653758
Sep. 28, 2016 (FR) ...................................... 1659160
Oct. 10, 2016 (FR) ...................................... 1659768

(51) Int. Cl.
G06T 19/00 (2011.01)
G02B 27/01 (2006.01)
G06F 3/01 (2006.01)
(52) U.S. Cl.
CPC .......... G06T 19/006 (2013.01); G02B 27/017 (2013.01); G06F 3/011 (2013.01);
(Continued)

(58) Field of Classification Search
CPC ........................ G06T 19/006; G06T 2219/024
See application file for complete search history.

(56) References Cited

U.S. PATENT DOCUMENTS 8,914,472 B1 * 12/2014 Lee .................... H04L 29/06476
709/219
2011/0292161 A1 * 12/2011 Sharon ................... H04N 19/59
348/E7.083

(Continued)

OTHER PUBLICATIONS

International Search Report for International Application No. PCT/FR2017/051004, dated Oct. 12, 2017.

Primary Examiner — Ryan McCulley
(74) Attorney, Agent, or Firm — Perman & Green, LLP

(57) ABSTRACT

In a device (100) and a method implemented by said device, two immersive systems are connected such that a virtual environment generated on a source immersive system (10) is reproduced on a target immersive system (20). The images of the virtual environment displayed on the display system of the source immersive system are transformed in order to be displayed on the display system of the target immersive system, such that a virtual reproduction of the virtual environment is correctly represented on the target immersive system for an observer, irrespective of the structural and software differences between the two immersive systems. Freezing certain display data and observation conditions of the source system results in a temporary stabilisation of the representation of the virtual environment on the target system without any negative effect on the coherence of the representation on said target system.

27 Claims, 4 Drawing Sheets

(52) U.S. Cl.
CPC ........ *G06T 19/00* (2013.01); *G02B 2027/014* (2013.01); *G02B 2027/0138* (2013.01); *G06T 2219/024* (2013.01)

(56) References Cited

U.S. PATENT DOCUMENTS

| | | |
|---|---|---|
| 2012/0162384 A1 | 6/2012 | Vesely et al. |
| 2013/0083173 A1 | 4/2013 | Geisner et al. |
| 2013/0117377 A1* | 5/2013 | Miller ............... G06F 3/017 709/205 |
| 2014/0306866 A1* | 10/2014 | Miller ................ G06T 1/20 345/8 |
| 2015/0130839 A1 | 5/2015 | Kasahara et al. |
| 2016/0005209 A1* | 1/2016 | Dachsbacher ........ G06T 15/06 345/426 |
| 2016/0027218 A1* | 1/2016 | Salter ............. G02B 27/0172 345/633 |
| 2016/0133230 A1* | 5/2016 | Daniels ............ G06T 19/006 345/633 |
| 2016/0212370 A1* | 7/2016 | Lee ................ H04N 5/44591 |
| 2016/0291922 A1* | 10/2016 | Montgomerie ....... G06T 19/006 |
| 2017/0301140 A1* | 10/2017 | Smith .............. G06T 19/006 |

\* cited by examiner

DEVICE AND METHOD FOR SHARING AN IMMERSION IN A VIRTUAL ENVIRONMENT

CROSS REFERENCE TO RELATED APPLICATIONS

This application is the National Stage of International Application No. PCT/FR2017/051004, having an International Filing date of 27 Apr. 2017, which designated the United States of America, and which International Application was published under PCT Article 21(2) as WO Publication No. 2017/187095 A1, and which claims priority from, and the benefit of, French Application No. 1659768, filed on 10 Oct. 2016, French Application No. 1659160, filed on 28 Sep. 2016, and French Application No. 1653758, filed on 27 Apr. 2016, the disclosures of which are incorporated herein by reference in their entireties.

BACKGROUND

1. Field

The present disclosure relates to the field of virtual reality and to the presentation of virtual environments and virtual environment sharing.

More specifically, the present disclosure relates to a device and a method for sharing the immersion in a virtual environment with users having immersion means that are different from the means having generated the virtual environment.

2. Brief Description of Related Developments

In the field of virtual reality, one or more users of a system for immersion in a virtual environment are immersed in the virtual environment by means of a hardware environment generating stimuli to provide users with sensations that are similar to, if not identical to, if not supposed to be, those that would be felt in a real environment that the virtual environment is intended to reproduce.

It is understood here that the representation is not necessarily realistic, but can also have some deformed, attenuated or exaggerated effects in order to produce specific sensations such as an enhanced perception of phenomena in the virtual world. For example, by means of a scale effect, a user can become immersed in a microscopic universe which would normally be inaccessible to him. A user can be immersed in order to observe an environment that is not visible under ordinary conditions, such as an aerodynamic flow, or to observe a representation of a non-physical environment, such as a database viewed in 3D.

In some cases, the same virtual environment is shared between a plurality of users.

The paragraphs hereafter refer to a visual representation of the virtual environment, in two or three dimensions; they shall more specifically describe the problems and solutions related to this visual representation in the context of the present disclosure.

One known solution for allowing at least two users to be immersed in a virtual environment consists of duplicating the data used to build the visual representation of the virtual environment on two immersive systems, whereby each system is allocated to a user, in order to obtain, on each of the two systems, a real-time rendering corresponding to the point of view of each user associated with a system. In such a case, the information regarding the position and/or the interactions made by each of the users are synchronised in order to allow each of the virtual environments reproduced on each of the systems to be in an identical state.

One advantage of this solution is that it allows each of the users sharing the immersion to have their own point of view over the shared virtual environment.

Thus, a user that is immersed by means of a first immersive system can look at the left side of an object, and a second user that is immersed in the same virtual environment by means of a second immersive system can simultaneously look at the right side of the same object.

In such a solution, each of the immersive systems must possess the data used to build the virtual environment, and the visual representation thereof, and all of the applications, in particular the software, allowing this data to be exploited, which conditions require the implementation of a data duplication step and the acquisition of licenses, which can be expensive, for the software implemented on each of the systems.

Moreover, when the two immersive systems are remote, data transmission poses confidentiality problems, in particular in industrial environments where the data carries a significant volume of information, which could have a sensitive nature, on the definition of the virtual environment, for example a digital model of a machine prototype.

Another drawback of this solution concerns the need for each immersive system to have digital processing systems with sufficient performance levels to generate the images of the virtual environment in real time on the display means of the immersive system, which performance levels must be even higher if the immersive system is to exploit a three-dimensional environment and/or produce a three-dimensional representation.

Another drawback of this solution is that the comfort of sharing the experience of the virtual world greatly depends on the quality of the network communication means implemented. Since sharing is based on the synchronisation of the data between a plurality of immersive systems, the latency times resulting from the network communication means affect the speed at which the data originating from a remote immersive system is updated in a given immersive system, thus causing potentially significant disparity between the effective state of the virtual environment at a given moment in time of the remote immersive system and that reproduced within the immersive system in question at the same moment in time.

According to another known method, which avoids the transmission of certain sensitive data, images produced by an immersive system for a user are filmed by a camera worn by the user, oriented to show the images in the user's visual field, and are transmitted for observation on a screen by individuals located close thereto or distant therefrom. However, this method does not provide the quality expected by a remote person observing a virtual environment since the image filmed is exploited on a single screen and since the image filmed generally comprises defects and artefacts as a result of the implementation by the immersive system of display systems for displaying the images comprising a plurality of screens assembled to form the immersive environment. Moreover, the individuals observing the image remotely are passive and have no interaction with said images. Furthermore, such a solution cannot be considered when the immersive system implements a virtual reality headset, whereby the images are in this case displayed very close to the user's eyes.

In the case of an immersive system comprised of a plurality of screens and/or images combined to obtain one large field of view, one of ordinary skill in the art knows that the images are composed for viewing from a given location of the display system and if observed from another location, the images viewed are deformed and contain junction defects when implemented on a plurality of screens.

Thus, even when the display system of the remote immersive system is identical to that of the immersive system generating the images of the virtual environment, in order for the images displayed to be correctly viewed by the remote observer, the position of his/her observation point in the remote display system must be the same as that of the user's observation point in the display system of the immersive system. The above condition is, in practice, impossible to comply with since each user must be free to move their head, even to a small degree.

Non-compliance with this condition on the positions of the observation points produces inconsistencies in the different images displayed in the remote display system, with deformations and discontinuities that are generally unacceptable for the proper understanding of the information displayed, and incompatible with performing an immersion.

SUMMARY

The present disclosure provides a solution to the different problems of the prior art in the field of the immersion of an observer in a virtual environment generated for another system.

One advantage lies in the fact that it avoids multiplied costs linked to software licenses.

Another advantage lies in the fact that it avoids the need to duplicate data and the data transmission restrictions.

Another advantage lies in the fact that the solution does not limit the choice of the hardware architectures of each of the immersive systems implemented.

Another advantage lies in the fact that it preserves the confidentiality of the data of the virtual environment.

Another advantage lies in the fact that it preserves the quality of the visual representation of the virtual environment and of the immersion in a remote system.

For this purpose, the present disclosure relates to a device for sharing an immersion in a virtual environment, comprising:
- a source system, transmitting operating data for a visual representation of the virtual environment, said operating data comprising display data relative to images of said visual representation and comprising data on the observation conditions under which the visual representation of the virtual environment was generated;
- at least one target immersive system, comprising a digital processing system transmitting images to at least one display system of said target immersive system.

Moreover, the device comprises: transmission means 30 for transmitting the operating data delivered by the source system 10 to the at least one target immersive system 20;

means for converting the display data, representative of images of the visual representation of the virtual environment delivered by the source system 10 associated with data on the observation conditions, in order to build images displayed in the display system 22 of the target immersive system 20, such that the set of images displayed by said display system of said target immersive system is the result of processing operations intended to enhance the immersion on said target immersive system 20 in the display data upon passage from the observation conditions transmitted by the source system 10 to effective observation conditions in the display system 22 of said target immersive system.

In practice, as will be understood in the description hereafter, enhancing the immersion involves compensating for any potential visual deformations resulting from the processing of display data on different display systems and/or according to different observation conditions. Enhancing the immersion can further involve modifying the position, in the virtual environment of the target system, of the portion of content of the virtual environment visible through the display system of the source system to present it in a stabilised manner, reducing the impact of the frequent head movements of the user of the source system.

Sharing can take place in real time, whereby the data transmission is carried out continuously, or can be in delayed time.

Furthermore, by having the target immersive system carry out the conversion of the display data for the part dependent on the effective observation conditions, including the data on the position of observation and/or direction of observation, in the display system of the target immersive system, the impact of the latency time is minimised, said latency time occurring between the display in the target system of the converted images and the processing thereof for the conversion of the display data from the effective observation point in the display system of the target system.

In one embodiment, the source system is an immersive system comprising a source display system displaying images of the display data of a visual representation of a virtual environment generated by said source system.

A system is thus obtained, wherein the operating data of the source system is generated with the interaction of a user of the source immersive system, whereby the immersion can be shared in real time or in delayed time with an observer of the target system.

In one embodiment, the conversion of the display data comprises a reconstruction of a 3D virtual representation of a source display system of the physical environment of the source display system, a position of an observation point of the observer in the display system of the target system being forced, for the conversion of the display data, to take the same position in said 3D virtual representation of the source display system as the position of observation of the user in the source display system.

In one embodiment, the source immersive system comprises a measuring system for measuring, in real time, the direction of observation, and/or the position of observation, in the display system of the source immersive system, of a user that would be immersed in the virtual environment of said source immersive system, and the at least one target immersive system comprises a measuring system for measuring the direction of observation, respectively and/or the position of observation, in the display system of said target immersive system, of an observer that would be immersed in the virtual environment displayed on said target immersive system.

An effective position and/or direction is thus known, from which the display data of the images displayed in the display system of the source immersive system have been generated for viewing by the user and an effective position and/or direction from which the display data of the images displayed in the display system of the target immersive system must be generated in order to be viewed by the observer and be representative of the virtual environment viewed by the user of the source immersive system.

Software for the partial processing of the display data can be executed on the digital processing means of the source immersive system, or on an ancillary computer connected to a network via which data is transmitted between the source system and at least one target immersive system, said software converting the display data generated by the source immersive system, representative of the images of the visual representation of the virtual environment of the source system, into display data corresponding to independent non-dimensional images of a structure of a viewing system that is to display the images, said display data corresponding to non-dimensional images being transmitted to the at least one target immersive system.

In this configuration, the conversion calculations for the display data that does not depend on the target immersive system are advantageously connected to the source system or to an independent ancillary computer. Such a solution allows, in a device comprising a plurality of target immersive systems, for the transmission to the different target immersive systems of the display data in a neutral, non-dimensional form, for which only the subsequent processing, specific to the target immersive system, is carried out by each of the target immersive systems.

In one embodiment, the non-dimensional images correspond to images projected onto an inner wall of a sphere, at the centre of which sphere the observation point of the source system is placed, in order to form the non-dimensional images in a solid angle corresponding to the images displayed on the viewing system of the target immersive system and capable of reaching four Pi steradians.

An observer of a target system can thus select a direction of observation in any direction in space without being limited by a "visual" field of the source system.

In order to assist the observer of a target immersive system in choosing a direction of observation in a virtual environment, the representation conditions whereof he/she does not have full control over, symbolic representations are advantageously superimposed over the visual representation of the virtual environment shown on the target immersive system to provide the observer with an orientation aid and aid in selecting a direction of observation.

These symbolic representations comprise, for example, the graphical materialisation of a sphere or of a grid associated with the representation of horizontal surfaces, for example a floor, and/or vertical surfaces, for example a wall.

Such symbolic representations, which can possibly be materialised solely on a temporary basis, for example when instructed by the observer, or under certain conditions, for example in the case of a fast evolution in the observation conditions of the source system, assist the observer for easier selection of the direction of observation and for identifying or locating his/her position in the virtual scene.

The display data processing software for building images displayed on the one or more screens of the display system of the at least one target immersive system can also be executed on the computing means of said target immersive system.

In such a case, the source system transmits the same data to all target immersive systems and the digital processing operations for the conversion of the display data are carried out by each target immersive system as a function of the configuration specific thereto and of local variables, such as the position and directions of observation of the observer in the display system of the target immersive system.

In one embodiment, the device comprises a plurality of target immersive systems simultaneously connected to the source immersive system. It is thus possible, thanks to the advantages of the present disclosure, to allow numerous observers, who can be located remotely and in scattered locations, to follow the immersion experienced by a user of the source system.

It is understood that a target immersive system can be situated at any distance from the source system, whereby the problems involving the synchronisation of the visual representation displayed in the target immersive system with the observation conditions of the observer are specifically overcome by the present disclosure.

In one embodiment, the source system comprises equipment for acquiring a digital or analogue signal, carrying display data, generated by the source system and which transmits, in a digital data format, said display data corresponding to the signal acquired, directly or indirectly, to at least one target immersive system.

This thus prevents the need for any intervention or modification to the hardware or software of the source immersive system, other than the connection of said acquisition equipment, whereby such interventions or modifications, where possible, are often burdensome.

In one embodiment, the source immersive system comprises software, executed on a digital processing system, for acquiring content of the display data of the source system, after the display data has been computed, and which transmits, in a digital data format, said content of the display data acquired, directly or indirectly, to the at least one target immersive system.

In these embodiments, such content advantageously corresponds to a data set that is sufficient for reproducing the images generated by the source system. Said data is, for example, the digital data sent to a display system of the source system, where relevant before analogue conversion, or data subjected to spatial and/or temporal compression algorithms for reducing the size thereof, or sets of attributes of each image: contours, textures, colours, etc.

The content is made up, for example, of images, or video streams, in yet another embodiment of stereo images, and in another example embodiment of a stereo video stream.

Advantageously, when looking to synchronise the source system and the one or more target immersive systems, a content format is determined as a function of the computing means of the source system and/or of the one or more target immersive systems, and as a function of the data transmission means, so as to limit lag between the processing operations on the operating data by the source system and by the one or more target immersive systems as much as possible, while taking into account the performance levels of the equipment implemented by the entire data transmission chain and the processing operations carried out on said data by the systems.

In one embodiment, the device comprises a data recording system, configured to record the operating data generated by the source system and for transmitting said operating data to at least one target immersive system in delayed time.

An immersion recorded on a source system can thus be replayed at any time and any number of times on any target immersive system.

In one embodiment, the source system comprises image processing software and a source display system, and a target immersive system comprises software for image synthesis and for generating a visual representation of a virtual environment in the form of images displayed on one or more screens of the display system of said target immersive system and further comprises equipment and/or software for acquiring the display data corresponding to the images displayed on the display system of said target immersive system, such that each of said target and source immersive systems can alternate between being a source system and a target system. In this embodiment, the device is shown to be particularly well suited to collaborative works carried out by a user and an observer capable of reversing their roles.

In this configuration, the hardware and software configurations of the two target and source immersive systems capable of reversing their conditions can be different, whereby the device according to the present disclosure bypasses the compatibility conditions in these areas often encountered with known systems. This configuration is also compatible with the simultaneous connection of other target immersive systems.

In one embodiment, the display system and the processing system of the target immersive system and/or of the source system are associated with interaction means configured such that they modify, via the display system and/or the processing system of the given immersive system, the content and/or the behaviour of the images displayed by the display system of the source system or of the given target immersive system.

Thus, each user of the source system and observers of the target immersive system have means for intervening with regards to the behaviour of the displays without detriment to consistency.

In one embodiment, the interaction means comprise a freeze command for selectively activating and deactivating the freezing of all or part of the display data and/or of the observation conditions used to generate the images to be displayed by the display system of the source system and/or of the target immersive system.

The observer of the target system, who does not have any means for controlling the operation of the source system, can thus freeze, at least momentarily, certain data of the representation of the virtual environment of the source system, for example in order to perfect an analysis.

In one embodiment, the interaction means of the target immersive system comprise a freeze command for freezing a subset of observation conditions in the display system of the source system and/or of the target immersive system.

In one embodiment, the interaction means of the at least one target immersive system are moreover configured for pointer use and/or for the annotation of the images displayed by the display system of said target immersive system.

The annotations are, for example, materialised in the form of inlays within the images.

In one embodiment, data characterising the pointing operations or annotations formed on images of a target immersive system are transmitted via the transmission means to at least one other connected immersive system. This other system, which is the source system or another target system, receiving this data can thus process this data for the display thereof.

The interaction means comprise, for example, one or more touch-sensitive surfaces or surfaces that are sensitive to the presence of a hand or finger, and/or one or more pointers.

The potential display system of the source system, and the display system of the at least one target immersive system, each belong to one of the categories among the group implementing flat screens and/or curved screens:
  multi-sided display systems;
  virtual reality, augmented reality or mixed viewing headsets;
  multi-screen display systems;
  screens;
  screens carried by a user or observer.

The configuration of the device can thus be adapted to suit numerous types of needs, in particular as a function of the cost, deployment speed and realism criteria for the graphical representations.

These categories, independently from the dimensions and shape of the screens, which can be flat or curved, can coexist inside the device of the present disclosure, whereby only the conversion calculations for the display data is modified to suit the specificities of the screens and of the display systems.

In one embodiment, at least one target immersive system is situated in a location that is remote from the source system, the physical separation of the two systems being such that the user of the source system and the observer of the target immersive system are not capable of communicating with one another without using technical communication means. In this configuration, spatial limitations are extended, which allow the sharing of an immersion.

In one embodiment, at least one target immersive system is situated in the vicinity of the source system, the physical separation being such that a user of the source system and an observer of the target immersive system can communicate directly with one another without any physical barrier, i.e. without the need to use technical means. It is in this configuration that a shared immersion is obtained, for example within the scope of collaborative works, without suffering from the inevitable artefacts produced when an observer is located in the vicinity of the user in the hope of feeling the effects.

Such a configuration is not only hypothetical insofar as it allows for the simulation, including at the same location, of the immersion, with simple hardware means, for one or more observers, in the virtual environment of the user of the source system, on the one hand without disrupting said user and on the other hand under optimum conditions, since an observer cannot position himself/herself in the display system of the source system under the same observation conditions as those of the user.

The present disclosure further relates to a method for sharing an immersion in a virtual environment of an observer in a target immersive system, comprising the steps of:
  generating, independently from the target immersive system, operating data for a visual representation of the virtual environment, said operating data comprising display data relative to images of said visual representation and comprising data on the observation conditions associated with said display data;
  displaying, on a display system of the target immersive system, images representing the virtual environment.

According to the present disclosure, the method comprises, for each image or set of images to be displayed, between the generation step and the display step, a conversion step, carried out at least partially on the target immersive system, for converting display data of the virtual environment generated in the generation step, the conversion step comprising the determination of the effective observation conditions of the operator in the display system of the target immersive system and the conversion of the display data associated with the observation conditions of the display data generation step, into display data corresponding to the effective observation conditions of the observer.

The display data generated by the source system, the display data being generated for observation conditions that are independent from the target immersive system, can thus be converted into display data corresponding to images adapted to suit the display system of the target immersive system and the observation conditions of an observer of said target immersive system in order to present the virtual environment to said observer.

In one embodiment, each image point of an image converted in the conversion step for display by the display system of the target immersive system, is determined as a function of at least one effective observation point in the display system of the target immersive system in order to preserve, to within a constant proportionality factor for the entire image at a given moment in time, a same relative direction of observation relative to any other image point of said converted image, observed from the effective observation point, as the relative direction between said image points in the display data of the visual representation of the virtual environment generated in the generation step, delivered by the source system and comprising the image data and the data on the observation conditions associated with said image data.

In one embodiment, the step of generating the display data for the representation of the virtual environment is carried out on a source system, which source system is: an image generation system for a virtual display; or a system for broadcasting a stream of real or virtual images generated in real time or recorded; or an immersive system in which a user is immersed.

In one embodiment, the reconstruction of a 3D virtual representation of the source display system of the physical environment of the source display system is carried out by the source immersive system or by the ancillary computer connected to the network. In one embodiment, the conversion of the display data comprises a reconstruction of a 3D virtual representation of the source display system, a position of observation of the observer being forced, for the conversion of the display data, to take the same position in said 3D virtual representation of the source display system as the position of observation of the user in the source display system.

According to this embodiment, a virtual source display system is created, the position whereof relative to the observer is reproduced from the position of the user in the real source display system.

The display system of the source immersive system is reconstructed virtually on the target immersive system, which virtual reconstruction is displayed on the display system of the target immersive system such that the observation conditions of the observer of said virtual reconstruction of the source system in the target immersive system correspond at least partially to the observation conditions of the user of the source immersive system in the source immersive system.

This conversion removes the need to duplicate the data of the virtual environment and can be applied to any form of target immersive system and for any software executed on the source immersive system.

In one embodiment, the display data conversion step is carried out in its entirety on the target immersive system after a step of converting the observation conditions and display data of the virtual environment, generated by the digital processing system of the source immersive system.

In another embodiment, the display data conversion step is carried out in part on the source immersive system, or on an ancillary computer connected to a network of the data transmission means, before a step of transmitting the observation conditions and partially converted display data of the virtual environment to the target immersive system, and the target immersive system converts the partially converted display data as a function of the operating data of the target immersive system in order to form the images displayed on the target display system.

Advantageously in such a case, the display data partially converted by the source immersive system, or the ancillary computer, is independent from the features and operating data of a target system, thus allowing the processing step to be factorised, or even reduced to a simple processing operation for display on certain target systems.

In one embodiment, the conversion step comprises a freezing step for freezing the display data of the representation of the virtual environment or for freezing the observation conditions, generated during the generation step.

In one specific embodiment, the data of the observation conditions in the display system of the target immersive system continue to be taken into account during the display data freezing or observation conditions freezing step.

It is therefore possible to maintain, for the user of the source system, a perception of the virtual environment generated by the source immersive system, while preserving, in the target immersive system, a correct and stable view of said virtual environment placed in this frozen condition despite variations in the observation conditions in said source immersive system. The display data in the target immersive system is thus interpreted as if the virtual environment was completely static and the user of the source system was no longer moving, thus resulting in a kind of 3D acquisition of the state of the source immersive system.

The observer is able to freeze, at least partially, the representation of the environment on the target system, and momentarily obtain a stable image on which annotations, for example, can be made.

In one embodiment, the method comprises an initialisation step in which the target immersive system initialises a register comprising data on conditions under which the display data is generated during the generation step.

In another embodiment, the display data conversion step is carried out in part on the source immersive system, or on an ancillary computer connected to a network of the data transmission means, before a step of transmitting the partially converted display data of the virtual environment to the target immersive system, which target immersive system converts the partially converted display data as a function of the operating data of said target immersive system.

BRIEF DESCRIPTION OF THE DRAWINGS

The description of the present disclosure is provided with reference to the figures which diagrammatically illustrate, in a non-limiting manner.

DETAILED DESCRIPTION

Figure 1:
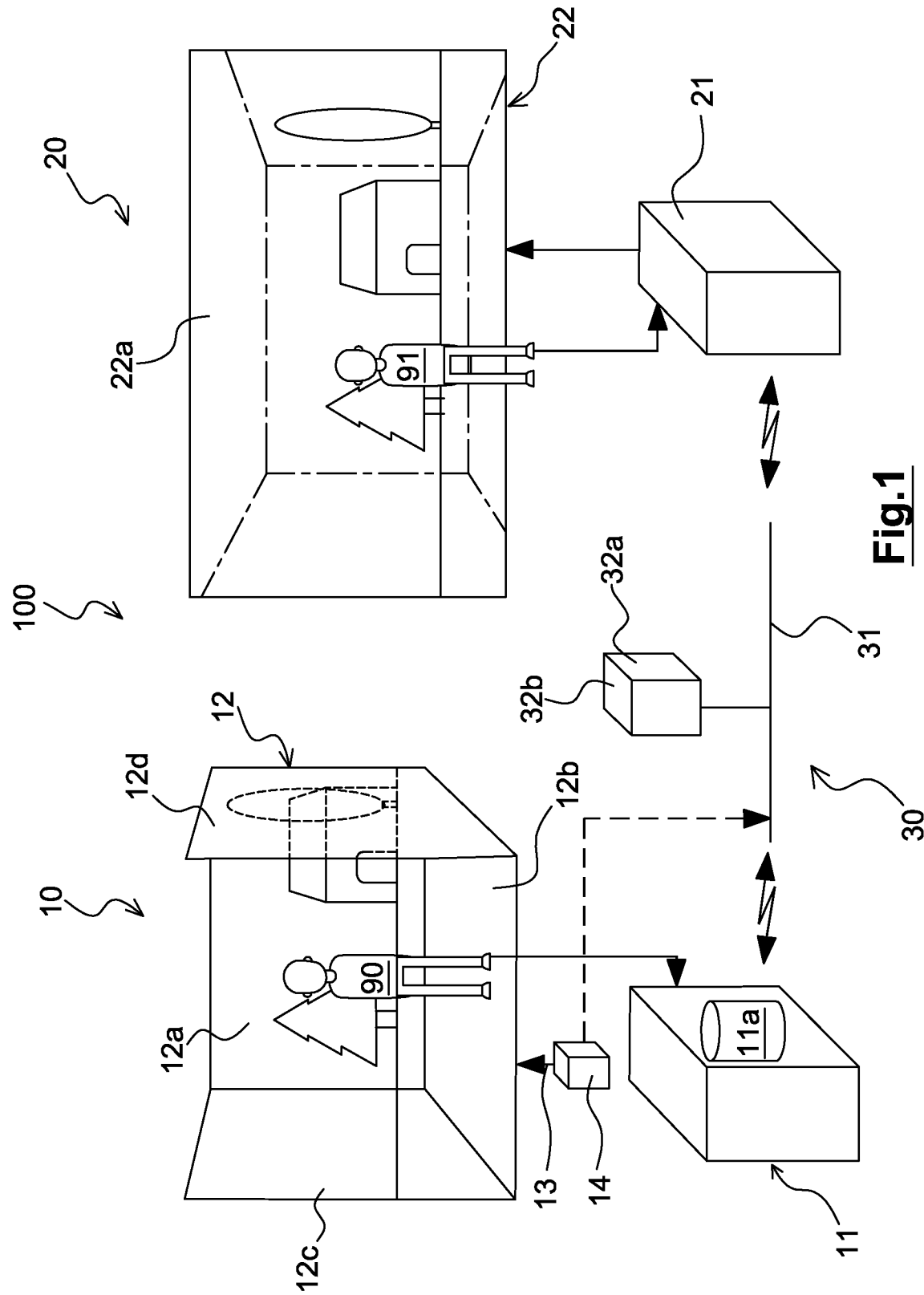
FIG. 1: a simplified example of a device for sharing an immersion in a visual environment with a source immersive system comprising a display system of the multi-screen type and a target immersive system of the single flat-screen type.

In the description, the terms and expressions hereafter must be understood as defined below:

Immersive system: A system intended to reproduce, in real time, sensory impressions for a user through stimulation means appropriate for the sensations to be reproduced. A visual immersive system generally comprises a set of hardware and software means in order to at least: generate images of a visual representation of a virtual environment; display images intended for at least one user; the images displayed being generated such that they represent the virtual environment as it must be perceived by the user according to his/her virtual environment observation conditions.

Display system: set of hardware means and, if necessary software means, comprising means for displaying images, for example one or more display screens arranged between one another in space in order to display the images to a user or to an observer, if necessary implementing conventional optical systems such as mirrors, beam splitters, optical collimating elements, filters, etc. The display system is associated, if necessary, with means for determining, in real time, in a system of reference linked to the screens, the position and/or the direction of observation, of a user or of an observer, looking at the images displayed by said screens.

Headset: the specific case of a display system wherein the screens are attached to a support worn by the operator on his/her head. In this specific case, the position of observation is fixed in the system of reference linked to the screens and the direction of observation is a function of the eye movements. This type of equipment can be associated with means for tracking, in real time, the orientation, or even the position, of the head in the physical environment, which will obviously not modify the position of the operator's head relative to the display system, but could be used by the calculation software for generating the representation of the virtual environment to change the position and direction of observation in a system of reference of the virtual environment.

Image: any form of visual representation shown on a screen. An image can be still, or moving as a result of a succession of images in time, and can result from a video stream, etc. An image can be transmitted, with a view to the display thereof on a screen, by an analogue signal or by a digital data set representing all or part (for example in the case of compressed signals) of an image, or both according to a given location in the image transmission chain between the generation of the image and the display thereof.

Virtual environment: an environment defining a digital data set defining the features of this environment and necessary for the construction of a visual representation of this environment as it must be perceived. The virtual environment can be the result of a 2D or 3D construction based on a digital model. The virtual environment can also be the result of the virtualisation of a real environment, for example by digitised images or video streams. The virtual environment can also be a combination of a digital model and a real environment according to an augmented reality principle.

Immersion: a situation wherein representations of a virtual environment are presented to one or more individuals so as to provide these individuals with the impression that they are physically surrounded by the information contained in the virtual environment. In order to enhance the sensory impressions, the display system can comprise a system for reconstructing depth perception, for example shutter glasses synchronised with the images displayed to present the user of the immersive system with images corresponding to each of his/her eyes in order to produce a stereoscopic effect.

In particular, the present disclosure considers the case of a virtual environment, the visual representation whereof is reproduced by the immersive system by means of a display system.

The virtual environment reproduced can be two-dimensional, 2D, or three-dimensional, 3D.

The digital information used by the immersive system can correspond, and often corresponds, to data of a three-dimensional 3D immersive environment, in which case a software application of the immersive system is an image synthesis application, which produces, at each moment in time, one or more new synthesis images by digital processing of the 3D information as a function of a position of an observation point, for example corresponding to an optical centre of a lens of a virtual camera.

The digital information can also be data of a two-dimensional 2D environment such as films, potentially pre-recorded panoramic films, which can be digitally processed by a software application for displaying images viewed from an observation point controlled by the user or controlled by a more or less interactive logic.

One of ordinary skill in the field of virtual reality knows the principles and mode of operation of the immersive systems that are currently widely used in numerous industrial applications, for example in computer-aided design, in simulators and training systems, and in gaming applications generally categorised by the expression "video games".

The description of these known immersive systems will therefore not be described in detail in this application; at most, elements, parts or sub-assemblies and principles will be referred to when considered useful to the understanding of the description or when the immersive system of the present disclosure could be considered at risk of not being understood according to the most conventional meaning of this term. In particular, in the present disclosure, a single screen of a computer or video monitor, or of a smartphone, can form the display part of a display system of an immersive system.

Moreover, in the example embodiment described, only the visual aspects of the immersion will be considered, whereby the other aspects thereof, for example the audio aspects, are not covered or are only briefly mentioned.

For the data exchanges taking place between the systems, the following expressions will be used in the description:
"operating data"
"observation conditions data"
"display data".

The operating data comprises the set of information of a representation of the virtual environment viewed in a viewing system by an observer, which situation can be real or virtual.

The operating data comprises the observation conditions data and the display data.

The display data in particular comprises information regarding the images generated by a source system 10.

For example, the display data comprises attributes for each of the image points of the images generated by the source system 12, these attributes in particular comprising, in addition to the luminance and colour features, the position of the image point in an image, for example an image to be displayed in said display system.

The display data is, for example, information contained in video frames.

The observation conditions data comprises in particular data regarding the position from which and the direction in which a user or an observer is looking in a system for displaying the images, or with which images have been generated, for example by an image capture device capturing a real environment that is then virtualised.

FIG. 1 shows, as an example embodiment, a device 100 comprising two immersive systems, a source immersive system 10 and a target immersive system 20, connected by data transmission means.

The source immersive system 10 in FIG. 1 is a known system that comprises, in the example shown, a digital processing system 11, comprising a permanent or temporary database 11a, used to store digital information defining a virtual environment, and a display system 12 for displaying images generated by the digital processing system.

The digital processing system 11 is, in practice, a computer, the power whereof is suited to the real time image generations, on which image synthesis software is executed.

In a known manner, the database 11a, in practice a memory or a file storage system, contains a set of data defining the virtual environment and required to generate a visual representation of said virtual environment.

The database further comprises data relative to the source immersive system itself, in particular parameters relative to the display system 12, including the dimensions, positions and shapes of screens (12a, 12b, 12c, 12d), on which are displayed the images used to form a representation of the virtual environment in which a user 90 is immersed.

It should be noted that, in addition to the data on the virtual environment and the parameters of the display system 12, the computing means 11 further receive values of variables, generally as a function of a user 90 under immersion conditions and/or of an operator of the immersive system, which are required by the software for image synthesis.

The variables in this instance comprise a position of observation and a direction of observation of the user 90 in a system of reference of the display system 12, on which position and direction of observation depend the images representing the virtual environment to be displayed on these screens in order to present, as seen by the user, a correct representation of said virtual environment from a position in said virtual environment in which the user is supposedly positioned.

Since the position and direction of observation must be known in order to generate each new image displayed, said position and direction of observation are, in a manner known by one of ordinary skill in the art, measured or estimated in real time or assumed.

Such variables are, for example, commands sent to the digital processing system 11, for example by the user 90 by means of control members, in order to act directly or indirectly on the virtual environment.

It is understood here that the variables are processed in a cyclic manner by the software application carrying out the synthesis of the virtual environment in order to present, in real time, i.e. with a latency and refresh time suited to the desired immersion, a point of view in the virtual environment corresponding to an observation point of the user 90 in the display system of the physical immersive system.

The display means 12 of the source immersive system 10 in FIG. 1 comprise a plurality of screens 12a, 12b, 12c, 12d forming a multi-sided system with four screens, in the example shown, often called CAVE in the field of virtual reality, determining a volume in which the user 90 can stand and move.

It should be noted that the dimensions of this example are not imposed and that any form of display system, whether multi-sided or otherwise, can be implemented, in particular depending on the advantages obtained to achieve the immersion objectives.

For example, an L-shaped arrangement of two vertical screens enhances vertical immersion. For example, an arrangement with three, four or five screens with angles of greater than 90° enhances the immersion of a plurality of users simultaneously. Certain screens can also be curved, cylindrical or spherical, and can prevent or reduce the number of screen juxtapositions forming angles. The screens can also be worn by the user by means of equipment such as viewing headsets, which can be more or less transparent depending on the desired result regarding the perception of the surrounding physical environment.

The source immersive system 10 belongs, in the context of the present disclosure, to a device 100 further comprising at least one target immersive system 20.

The target immersive system 20 comprises at least one digital processing system 21 and one display system 22. The target immersive system can be similar or even identical, in the structure and means thereof, to the source immersive system 10, or different therefrom.

In particular, the display system 22 of the target immersive system 20 can be identical to the display system 12 of the source immersive system 10, or conversely can be different therefrom, for example by the number of screens implemented, and/or by a shape of the screens, and/or by the size of the screens, and/or by an arrangement of the one or more screens, and/or by the fact that the one or more screens are carried or not carried by the user and/or by the capacity or incapacity to reproduce images for a stereoscopic observation.

In the example of the device 100 diagrammatically illustrated in FIG. 1, the display system 22 of the target immersive system only comprises a single screen 22a, whereas the display system 12 of the source immersive system comprises four thereof.

The screen 22a, as the sole screen of the display system 22 in the example embodiment shown in FIG. 1, is, for example, a projection screen, or a conventional video screen, television or computer screen, or even a smartphone screen.

The digital processing system 21 of the target immersive device 20 mainly comprises a memory, or a local database, which is used to store features of the source immersive system and of the target immersive system used to convert display data corresponding to the images, and a digital computer on which display data processing software is executed, the principles whereof are described at a later stage in the description.

For simplicity purposes in the description hereafter, the terms "source" and "target" will be used to denote the elements of the source immersive system 10 and of the target immersive system 20 respectively. Depending on the context, the source immersive system 10 can be referred to as the "source system" and the target immersive system 20 can be referred to as the "target system".

The device 100 further comprises data transmission means 30 for transmitting data between the source system 10 and the target system 20.

Such data transmission means 30 consist of all known means in the data transmission field for transmitting data between computers, and which will be, in the case of the present disclosure, chosen as a function of the data flow that must be obtained, the distance between the immersive systems of the device, the number of connected systems and the available resources in terms of communication means. In one embodiment, the data transmission is carried out by a communication network such as the Internet network and the implementation of communication protocols and interfaces suited to this network. The data transmission can also implement different types of optical connections, radio connections, and wired connections.

The description hereafter is made with reference to the operation of the device 100 when the source system 10 generates the display data of a virtual environment, the images whereof are displayed on the source display system 12, in which virtual environment the user 90 is immersed, and when said source system transmits, to the target system 20, data relative to the display data generated by the source digital processing system 11.

It should be noted that the detailed description only makes reference to a single target system for simplicity purposes; however, the device 100 can comprise any number of target systems, whereby all target systems are independent from one another, can take on different structures, and operate in a similar manner with the data received from the source system.

During operation of the device 100, the image generation software executed on the source digital processing system 11 generates a representation of the virtual environment in which the user 90 of the source system is immersed, and produces display data for said representation of the virtual environment for each of the different screens 12a, 12b, 12c, 12d of the source display system 12.

This display data is generated as a function of the parameters capable of modifying the visual perception of the virtual environment by the user 90, in particular as a function of a position in space of a point from which the user 90 views each of the screens 12a, 12b, 12c, 12d of the source display system 12 and a direction of observation in which the user is looking, the direction of observation corresponding to an optical axis of the observation means, in practice of the eyes. This position and this direction associated thereto are generally referred to hereafter as the "observation point".

The observation point can be a single point and, for example, correspond to an intermediate position between the two eyes of the user 90.

The observation point can also be dual when looking for depth perception through binocular vision; thus, the position of each eye of the user 90 determines one observation point.

It should be noted that, in order to perform the computations corresponding to the generation of the display data corresponding to the images displayed on each of the screens, the digital processing system associated with the display system must possess data relative to the features and arrangement of the different screens of the display system.

The images generated are displayed on the corresponding screens.

The operating data generated by the source system is transmitted, via the data transmission means 30, to the target system.

It should be understood that said operating data can be transmitted in any data format according to a protocol understood by the target system and that allows the display data and the associated observation conditions to be reproduced.

However, the operating data generated by the source system cannot directly produce the images displayed correctly on the target display system 22, in particular as a result of the structural differences between the source and target display systems, and/or the observation conditions attributed to the user 90 and to the observer 91 respectively, in each of the source and target systems, which are not correlated.

More specifically, even for the hypothesis wherein the source and target display systems are identical, the observation point, and thus the observation conditions, of the observer 91 in a system of reference of the target display system 22 cannot in practice be kept constantly identical to the observation point of the user 90 in a system of reference of the source display system 12, and supposing that the display data generated by the source system is displayed directly in the form of images on screens of the target display system, they would give an observer 91 of the target system a deformed, or even unexploitable view of the virtual environment.

By way of illustration of a simple situation wherein the source and target display systems are identical, an image of a straight line in the virtual environment, which would be generated in the source system 10 for display on two screens, the display surfaces whereof are not coplanar, would appear as a broken line to an observer of the target system 20, the observation point whereof would be different from that having been used to generate the display data in the source system.

In order to present the observer 91 of the target immersive system with a consistent representation of the virtual environment in which the user of the source system is immersed, each image through the operating data received by the target system from the source system is converted by display data processing software as a function of the observation conditions in the source system of the target system. The image processing software is preferably executed, at least partially, by the target digital processing system 21.

As will be understood in the description hereafter, a part of the image processing operation can also be carried out by the source system, or by any system having the capacity to communicate with the source and target systems for receiving and transmitting the necessary data.

The display data conversion mainly consists of virtually reconstructing the physical environment of the source display system 12 and in forcing the observation point of the observer 91 to take the same position in the virtual source environment as the observation point of the user 90 in the source display system 12.

Figure 2:
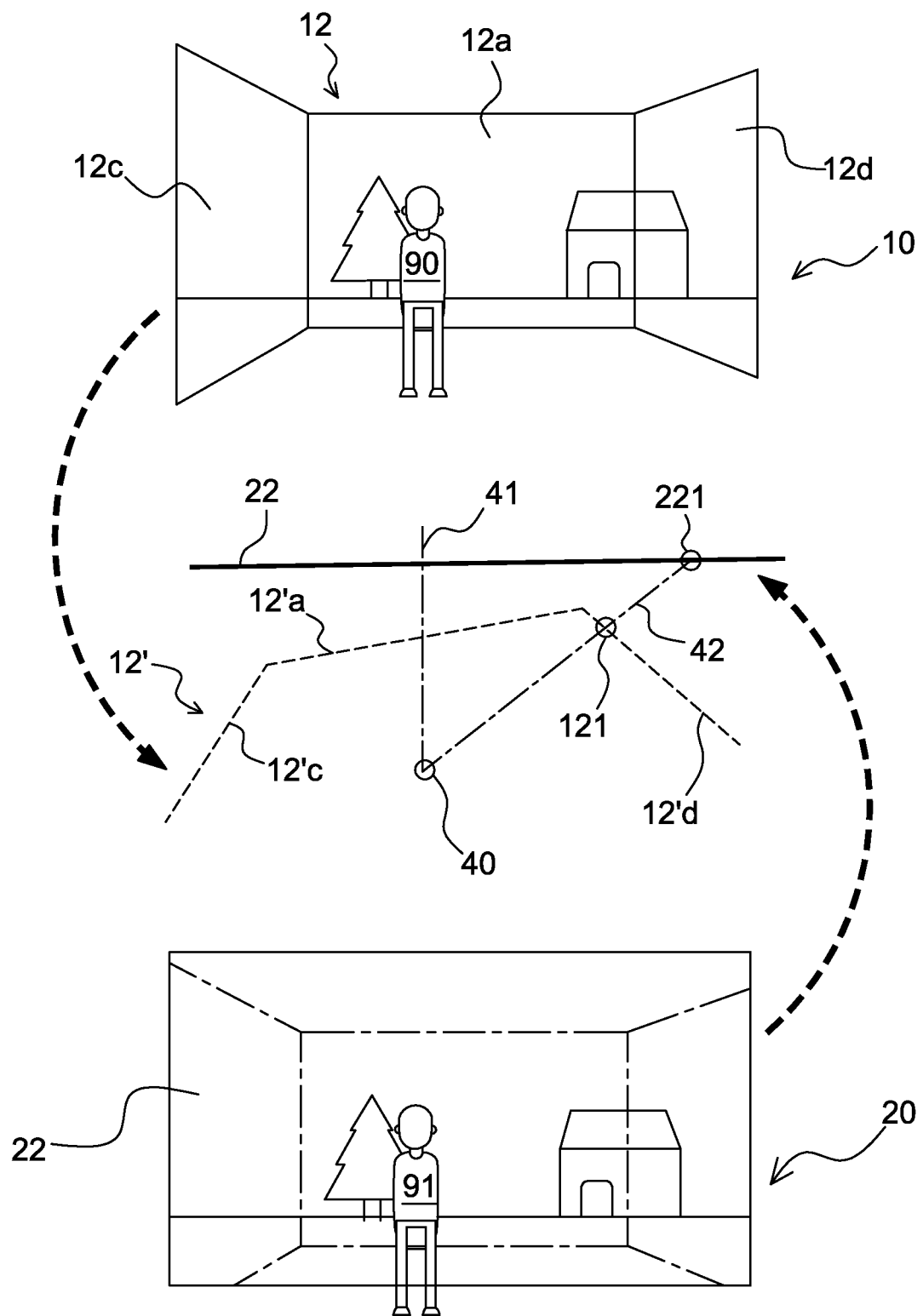
FIG. 2: an illustrated example of the conversion principles for converting an image, generated in a source immersive system with a display system and observed in a target immersive system with a different display system, for preserving the visual immersion conditions.

According to this principle, as shown in FIG. 2, a 3D virtual representation of the source display system 12' is created in the target system 20, as a function of the parameters of the source display system 12, on virtual screens 12'a, 12'd, 12'c, from which virtual representation of the source display system are displayed the images of the display data received corresponding to each of the real screens 12a, 12d, 13c of the source system, see FIG. 2. A 3D virtual environment is thus formed in the target system, said environment representing, at all times, to within the latency time, the source display system 12 with its visual representation of the virtual environment of the source system.

The target system 10 thus digitally processes the 3D virtual representation of the source display system 12' to construct a visual representation therefrom on the target display system 22 as a function of the observation conditions of the observer 91 of the target system, in which visual representation on the target display system, the effective position and orientation, either measured or assumed, of observation in the target display system are also the position and orientation of observation in the 3D virtual representation of the source display system and which correspond to the effective positions and orientations, either measured or assumed, of observation of the user in the real source viewing system, as shown in FIG. 2, where a centre 40 of the projections corresponds to both the virtual observation point in the 3D virtual representation of the source system and to the effective observation point in the target system 22.

The digital processing operation in such a case corresponds to 3D projections of the images of the 3D virtual representation of the source display system 12' on the one or more screens of the target display system 22, said projections having a centre 40 of projection made up of the position and orientation of observation, in the 3D virtual representation, of the observer 91.

The target system 20 thus presents the observer 91 with a virtual source system in that it reproduces the behaviour, at any time, for the images displayed of the virtual environment, of the source system 10 and in that it ensures that, regardless of the position and orientation of the observer 91, said observer has a position and orientation in the 3D virtual representation of the source display system 12' that is identical to that of the user 90 in the source system 10, even though the source and target systems can have different configurations and even though the user 90 and the observer 91 have observation conditions that are, in practice, changing independently in their respective immersive systems.

For example, in order to generate a consistent representation of the virtual environment on the target immersive system, the observations points of the user 90 of the source system and of the observer 91 of the target system are superimposed in the 3D virtual representation of the source display system 12' and taken to be the centre 40 and a reference axis 41 of a spherical coordinate system used to produce the projections. Each image point 121 of the real 12 or virtual 12' source display system in a given direction 42 from the observation point 40 corresponds to an image point 221 of the target display system 22 in the same direction and the image point 221 in the target system thus uses the features (colour, luminosity, etc.) of the image point 121 of the source system. Naturally, this condition is only valid if the two image points visually superimposed in the two immersive systems exist.

If, during these projections, an image point of the source system does not have any projection equivalent in the target system, it cannot be displayed in said target system. Conversely, if an image point of the target system does not have a projection equivalent in the source system, the image point in said target system will correspond to a "blank" area in the display of the target system.

If the display data generated by the source system 10 has been processed according to the aforementioned principles, the images are displayed by the target system 20 on the one or more screens of the display system of said target system.

It should be noted that the position and orientation of the observer 91 of the target system relative to the target display system 22 form parameters that are taken into account when carrying out the conversion of the display data. This consideration is necessary to ensure that the virtual environment is represented in a manner consistent with the point of view from which it was generated on the source system, and that the desired immersive effect is reproduced on the target system.

However, for the reconstruction of the display data on the target system to be consistent, the condition regarding the superimposition of the positions of observation is necessary, whereas the condition regarding the superimposition of the directions of observation is optional, said latter condition only being justified when the visual representation viewed by the observer 91 in the target system 20 is desired to be that of the user 90 in the source system, including in terms of direction.

If only the positions of observation are kept identical, the observer 91 in the target system is able, within the limits of the solid angle of the space in which an image is displayed, to view the representation of the virtual environment in a direction that is different from that in which the user 90 is looking at this virtual environment in the source system, however that corresponds to the visual representation that said user would have obtained in the source system had he/she been looking in the same direction as the observer in the target system.

It must therefore be understood that, depending on the desired effect, only the data relative to the position of the observation point alone, or that relative to the position of the observation point combined with the direction of observation, can be exploited.

The position of the observation point and the orientation of observation of the observer 91 are determined, for example measured in real time and transmitted to the target digital processing system 21, in order to be taken into account in the display data conversion computations. If necessary, the position and/or the direction of observation are simply estimated or assumed. For example, when a plurality of observers are looking at the one or more screens in the display system of the target system, mean values of the observation conditions of the different observers can be calculated or assumed, it being understood that this is a compromise that will inevitably lead to distortions in the images displayed by the target system that could be perceived by certain observers.

A target system 20 is thus produced, allowing an observer 91 to be immersed in a virtual environment created by a source system 10, which can be remote.

This result is obtained without the transmission of data in the database 11a implemented by the source system, including with a target system 20, the configuration whereof, in particular that of the display system, is different from that of the source system 10. Among other possibilities, it allows a digital processing system 21 to be implemented in the target system 20, said digital processing system having performance levels that are lower than those required by the source system 10 to generate the virtual environment. It does not require the implementation of expensive image synthesis software. It does not require the display systems of the source and target systems to be compatible with one another, nor does it require that the observer 91 maintains the observation conditions imposed in the target viewing system 22 in order to view the images as the user 90 perceives them in the source display system 12.

The embodiment of the device 100 described is only cited by way of example.

The hardware architectures of the source system and of the one or more target immersive systems can be different from those illustrated in the description for carrying out the same functions.

The conversion of the display data transmitted can be carried out by any conversion algorithm capable of producing the necessary projections, whereby the aforementioned method is only a simplified, theoretical illustration of the conversion through spherical projections.

The conversion of the display data is advantageously carried out by the target system, which knows the definition of its display system 22 and which takes locally, in real time, with a minimum latency time, the other parameters specific thereto as the observation conditions of the observer. In such a case, the target system must also possess the definition of the conditions under which the source system generates the display data, in particular the parameters of the display system, for example transmitted at the start of the connection with a non-variable data set of the operating data to the device of the source and target systems, in addition to the position and orientation of observation of the user 90 in the source display system 12.

However, the conversion of the display data can be partially carried out by the source system, or by another system, provided that the target system transmits the operating data required for the processing operations on the display data in order to produce the images to be displayed on the display system of said target system.

In such a case, as mentioned above, the conversions applied to the display data requiring the use of variables specific to the target system 20, in particular the position and direction of observation of the user 91 of said target system, are carried out on the digital processing system 21 of said target system, which is used to synchronise the images displayed by the target display system 22 with said variables specific to the target system.

In one embodiment, the source system 10, or another ancillary computer, carries out a first conversion of the operating data into non-dimensional operating data, independent from the structure of a viewing system to be used to display the images, for example by attributing the features of each image point associated with a direction of said image point determined in the form of spherical coordinates in a system of axes attached to the observation point in the display system 12 of said source system. The target system 20 thus uses the non-dimensional operating data received to produce display data suitable for its display system 22 by attributing, at each point of a screen in a given direction of the observation conditions in the target display system 22, the features attributed to the image point corresponding to the same direction in the non-dimensional display data.

In the example embodiment described in detail above, the target immersive system allows the observer 91 to correctly view a representation of a virtual environment substantially simultaneously to the generation of said representation by another immersive system.

In other embodiments, a source system transmitting the representation of the virtual environment is not necessarily associated with display means. Such a source system is, for example, a recording of the display data carried out on an image synthesis system, which may or may not be an immersive system. Such a source system is, for example, a system delivering images of a real world, recorded or in real time, virtualised by said system for transferring display data. Such a source system can also be a system combining the capacity to produce synthesis images combined with images of a real world in line with an augmented reality logic.

When a stereoscopic visualisation of the virtual environment is produced in an immersive system, each eye sees a different image corresponding to different observation conditions that can result in the need to convert the display data for each of the observation conditions, at least when the two source and target systems are configured to display the images of the virtual environment with depth perception.

In these embodiments, the display data comprises virtual or virtualised images, which are representations of the virtual environment viewed in a window of observation of the source system, equivalent to the display system of the source immersive system of the embodiment described above.

The display data received from the source system by the target immersive system is interpreted in order to reconstruct, in the display system of the target immersive system, a representation of the environment viewed in the source window of observation.

Thus, the observer in the target immersive system is presented with a stable representation of the representation of the environment viewed by the source system while ensuring the consistency of the images displayed in the display system of said target immersive system with those of the source window of observation via which this environment is or was generated and/or viewed.

The target digital processing system 21 has the capacity to synthesise display data suited to its own display system, which can advantageously be exploited in order to ease understanding and/or enhance the immersion of the observer of the target system. Thus, the target immersive system comprises, if necessary, all or part of the following features, which can be combined in the target immersive system provided that they are compatible with one another:

areas of the display system of the target immersive system, not covering the images transmitted by the source system in the display data, display a background generated by the computing means of said target immersive system, in particular to improve the visibility or legibility of the representation displayed.

the background comprises one or more patterns from the group consisting of: a colour, a plain grey or black; differently coloured, grey or black areas, the directions of the separations and/or transitions whereof correspond to privileged directions of the environment; one or more textures.

a texture is superimposed over the image of the window of observation. Such a texture increases, if necessary, the perception quality of the representation of the environment by the user of the target immersive system by producing a representation corresponding to a customary perception of the environment.

the computing means of the target immersive system are configured to inlay one or more interface elements in the display of the target display system, represented as one-, two- or three-dimensional objects. In this way, the user of the target immersive system has a set of functions that he/she can access through said interface elements such as, for example, image freezing functions, recording functions, and annotation functions.

a position and/or dimensions of the images of the source display data represented in the display system of the target immersive system are a function of a position from which, and/or of a direction in which, in the display system of said target immersive system, the observer immersed in said target immersive system is looking at said display system of the target immersive system. In this manner, the movements of said observer are taken into account to correct the images displayed and maintain the view with an accurate perspective.

at least one part of the images of the source display data is kept on display in the target display system when said images are theoretically outside of a display area of the target display system, said at least one part of the image of the window of observation being represented as maintained against an edge of said display area of the target display system in a direction in the system of reference of said target display system to which an observer of the target immersive system should displace a direction in which he/she is looking or should displace the orientation in the virtual environment of the target viewing system in order to move closer to the direction of observation corresponding to the display data received from the source system. The user of the target immersive system therefore does not completely lose the view of the environment, even though the representation thereof is theoretically outside of his/her field of vision, allowing him/her to intuitively find the direction in which he/she must look in order to retrieve, in his/her current position, the representation of the virtual environment.

if the images of the display data transmitted by the source system are outside of the display area of the display system of the target immersive system, a symbolic representation is inlaid in the vicinity of an edge or is attached to an edge of said display area in a direction, in the system of reference of the target display system, to which the observer of the target immersive system should displace a direction in which he/she is looking or should displace the orientation in the virtual environment of the target display system in order to move closer to the direction of observation associated with the display data transmitted by the source system. Thus, the user naturally identifies the direction in which the image is located, even when he/she has lost visibility thereof in his/her target display system.

the target immersive system comprises interaction capacities allowing a user of said target immersive system, through real or virtual controls accessible to said user, to interact with the images displayed by the target display system.

the interaction capacities comprise the superimposition of annotations, text and/or drawings, over the images displayed.

the immersive system comprises a recorder for recording the images displayed by the target viewing system during an immersion session.

Figure 4:
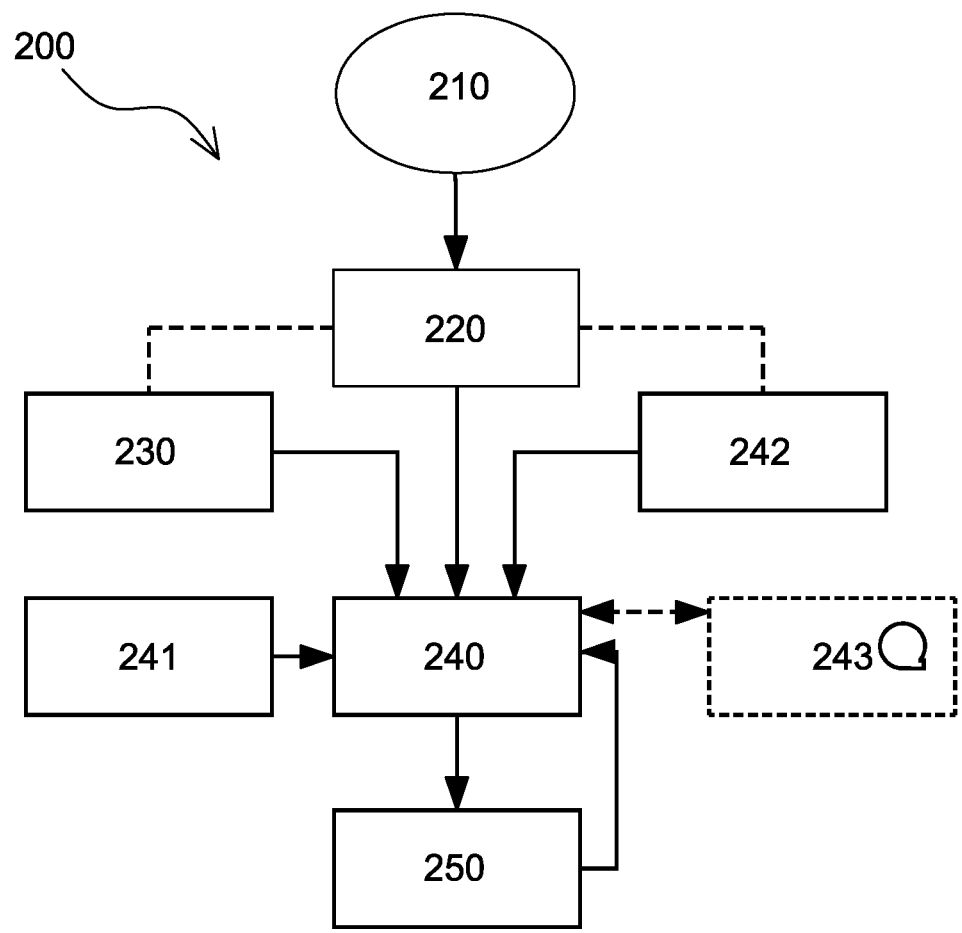
FIG. 4: a simplified block diagram of the method according to the present disclosure.

The present disclosure further relates to a method 200, FIG. 4, for sharing an immersive environment between a source system 10 and at least one target immersive system 20, of a device 100, while limiting the data exchanged both due to the confidential nature thereof and to limit the hardware and software requirements of the target system.

According to the method, a set of information or data is exchanged between the source system and one or more target systems, said set of information or data allowing each target system receiving operating data from the source system to reproduce and update, in real time, a visual representation of a virtual environment replicating, at least in part, the visual representation of the virtual environment generated by the source system.

As described above, in the device 100, each of the source system and of the one or more target immersive systems that take part in the sharing of an immersion incorporate connection means for connecting to transmission means 30 ensuring the connection of said source system and said target immersive systems.

According to the method, in a prior step 210, a set of configuration data is associated with each of the source system and target immersive systems.

The configuration data incorporates all information required for the physical or virtual description of the source system or of the target immersive system, and in particular the full-scale reconstruction thereof.

The configuration data of an immersive system comprises, for example:

an identifier identifying the immersive system;
a number of screens;
the sizes and shapes of each screen;
an arrangement of screens in a system of reference of a display system;
a capacity for displaying stereoscopic images and associated conditions;

colorimetric and/or geometric conversions specific to the system and to be applied to each pixel of an image to be displayed on a screen;
capacities to reproduce one or more positions and directions of observation.

This data is adapted as necessary to suit the specific form of the system considered and the implementation conditions thereof.

The configuration data, the list whereof provided hereafter is neither exhaustive nor compulsory, but which must include at least all information required for the data exchanges and data processing operations carried out during the implementation of the method, is determined for each immersive or non-immersive system of the device in a manual, automatic or semi-automatic manner depending on the capacities of the system considered.

In some embodiments of immersive systems, some of this data can vary over time, for example in the case of a mobile immersive system, the orientation and/or position of the screens of which vary over time during an immersion.

In such a situation, the configuration data is transmitted to the one or more target systems in a manner similar to that of the operating data as described for the following steps.

The configuration data can be incorporated into the operating data.

In a first initialisation step 220, the device 100, grouping together the source system 10 and the target systems 20, via which an immersion must be produced by the target immersive systems, or shared with the source system, is initialised.

In this initialisation step, each of the target immersive systems 20 of the device initialises a register of the connected source system, said register advantageously comprising all of the configuration data of each of said connected systems, and advantageously all of the configuration data at least of the source system 10 for the target systems 20.

In practice, the configuration data, in addition to initialisation values of variables, initialised by a given immersive or non-immersive system, could be limited solely to the data strictly required for the data transmissions and computations to be carried out by said system.

All of the configuration data of the source system must be accessible to a target immersive system at all times so that said source system can transmit the display data to said target system, whereby the accessibility of this data can be achieved, in one embodiment of a device 100, for example via a record in a database local to the digital processing system of said target immersive system.

In another embodiment of a device 100, a data server 32*a*, connected to the network 31 of the data transmission means 30, and accessible to each of the source system 10 and target immersive systems 20, comprises a database used to store configuration data for each of the immersive or non-immersive systems of said device, at least as regards that required during the initialisation step, and each of the immersive systems during this initialisation step receives the configuration data from the server, at least the configuration data required by the immersive systems in view of the conversions that must be carried out on the display data.

Advantageously, regardless of the method of implementing this first step, the database can be updated during the implementation of the method as a function of the connection, disconnection or role change of at least one immersive system of the network.

In an environment-generation step 230, which step is independent and carried out in a recurring manner when the source system 10 is in operation, source operating data of the visual representations of a virtual environment is generated on said source system.

The source operating data comprises:
the "observation conditions data"
the "display data".

The observation conditions data comprises the position from which and the direction in which, each position and direction capable of being measured or assumed, the user is looking in the source display system 12 at a given moment in time, or in which images have been generated, for example by an image capture device capturing a real environment that is then virtualised. This data is taken into account in the generation of the representation of the virtual environment for a user of the source system immersed in said environment and is used in the construction of the images displayed. In the absence of measured values, the positions and/or the direction are assumed, for example by identifying an ideal position and/or orientation for using the display system, or a mean position and/or orientation if a plurality of users can be accommodated, or an imposed position and/or orientation if the immersive system encourages the one or more users to move to a specific position and/or orientation.

In one embodiment, the display data, computed for each display cycle as a function of a frame rate of said display data, is acquired, once computed, by a software application executed in the digital processing system 11 of the source system.

In another embodiment, the display data is acquired during the transmission thereof to the source display means 12, for example by a connection to the video link 13 of video equipment 14 between the source digital processing system 11 and the source display means 12.

In one embodiment, if the source immersive system displays stereoscopic images, the display data acquired is acquired for only one of the observation conditions, for example the display data corresponding to a single eye, or in stereo, as a function of the capacity or incapacity of the target system to reproduce images in stereoscopic mode or as a function of options chosen by an operator of the target system. The data flow can thus be reduced, in addition to the bandwidth needs of the data transmission means 30.

In one embodiment, if the source immersive system estimates and uses positions and orientations of a plurality of users simultaneously, the display data is acquired for each of the observation conditions and associated with the corresponding observation conditions in the operating data.

The video equipment 14 is thus used to acquire display data during the transmission thereof to the source display system 12, for example by reading signals corresponding to the images over the video link 13, converts said images into a format suitable for the transmission thereof and transmits said images via the data transmission means 30 of the device.

At the end of this step 230, the source operating data is sent, directly or indirectly, by the source system to the users of the information contained in said source operating data. The users are, for example, each of the target immersive systems that are connected to said source system or to an ancillary computer 32b connected to the network 31 that receives the data for the retransmission thereof to the target systems, possibly after having carried out a processing operation on the operating data.

In a second conversion step 240, the source operating data is converted as a function of the configuration data of a target immersive system, and as a function of variables generated 242 by said target immersive system, in particular the observation data corresponding to the effective observation conditions in the display system 22 of said target immersive system.

During this second step, the following operations are carried out:

Full-scale 3D reconstruction, relative to the target viewing system, of the geometric configuration of the source display system in order to obtain a virtual source display system without images, i.e. independent from images that are displayed on the one or more screens of said source display system;

Display of the associated display data on each of the screens of the virtual source display system in order to obtain a complete virtual representation of the state of the displays of the source system described by the display data received;

Repositioning of the virtual source display system relative to the observer using the target system such that the data of the virtual source observation conditions, corresponding in the virtual source display system to the real observation conditions data in the real source display system, corresponds to the effective target observation conditions data, at least for the position of observation;

Synthesis of the images constituting all of the display data of the target system by the digital processing means of the target system as a function of the target observation conditions data, using the data of the environment reproduced on the target system from the operating data of the source system.

Advantageously, in one embodiment, the virtual 3D reconstruction of the source display system, without any images displayed on display means of the virtual source system, can be cached by the digital processing system of the target immersive system, and thus be reused for subsequent iterations.

According to the display data conversion principle of the method, the observation conditions data of the virtual environment of the source system is the same as the observation conditions data of the observer 91 in the virtual environment displayed in the virtual source display system on the target system, whereby the visual representation of said virtual environment is reproduced for this purpose. This condition is forced such that the images generated by the source system 10 can be viewed without deformation by the observer 91 in the target display system 22.

The display data initially computed by the source system thus does not need to be recomputed for new observation conditions in the target system, whereby the observation conditions, as regards the position and direction of observation, are virtually superimposed in the virtual environment of the source system and in the virtual environment of the target system.

All of the data and programs required by the digital processing means of the source system for computing the display data therefore do not need to be replicated on the target system, unlike in the prior art.

In specific cases, for example when taking into account stereoscopic vision, thus implementing two separate observation points, all of the observation conditions data can be duplicated in order to correspond to each of the observation points, or transmitted for a single observation point only, whereby the observation conditions for the second point are limited to relative position data of the second point relative to the first, for example the distance and direction of the second point relative to the first point, thus limiting the volume of the observation conditions data to be transmitted.

The observation data can also correspond to a fictive observation point, for example a cyclopean eye, the observation conditions for each of the points being limited to relative position data of each of the real observation points relative to the fictive point.

In one embodiment, all or part of the operating data transmitted by the source system is frozen either by the source system before the transmission thereof, or by the target immersive system upon receipt thereof.

This can involve display data, observation conditions data, or a subset of observation conditions data.

In such a case, the frozen data is either no longer transmitted by the source system, or is transmitted with constant values, or is only temporarily no longer taken into account by the target system and the last operating data received and processed by the target system is frozen.

Freezing is controlled by a command from one of the source or target systems, for example upon a command from the user 90, or from the observer 91, or from an operator of the source system or of the target system. The order can also affect the source system, which is thus frozen and, in such a case, the target system is subject to the freezing of the concerned data, or can only affect the target system which, in such a case does not necessarily involve freezing of the source system, but only an interruption in the taking into account of changes in the data concerned and delivered by the source system.

Upon activation of this data-freezing step 241, the possibility of updating the images on the target immersive system by processing the operating data frozen in said freeze operating mode is preserved, whereby said target immersive system can, in such a case, recompute, in real time, the display data for the images to be displayed by the target display system as a function of changes to the observation conditions in said target display system in order to preserve a correct representation of the frozen virtual environment.

In this mode of operation, an observer 91 can move within the target viewing system without the representation of the virtual environment becoming unstable. The observer 91 can thus more easily implement pointing or annotation methods, well known by one of ordinary skill in the art, impacting the source system, for example within the context of collaborative works on the virtual environment, even though such methods can be applied when the freeze function is not activated.

It is also possible to maintain, for the user 90 of the source system, an accurate perception of the virtual environment generated by the source immersive system, while preserving, in the target immersive system, a correct and stable view by the observer 91 of said virtual environment placed in this frozen condition despite variations in the observation conditions in said source system.

The display data in the target immersive system is thus interpreted, when the corresponding data is frozen, as if the virtual environment was completely static and the user of the source system was no longer moving, thus resulting in a kind of 3D acquisition of the state of said source system.

Through specific commands, the freezing step can also concern all data relative to the observation conditions, or only a subset of this data. For example, during a freezing step, an operator, a user or an observer can choose whether or not to freeze the observation data position variables and whether or not to freeze the observation data orientation variables.

Advantageously, the data displayed by the virtual source display system no longer varies, and the image points of said virtual source display system, on which the pointing operations and/or annotations are carried out, are constant.

In one embodiment, a step 243 of recording the source operating data is activated.

Advantageously, in one embodiment, said pre-recorded source operating data is used by the processing system as source operating data, thus allowing a pre-recorded immersion to be replayed on the target system, which could be said source system.

In a third display step 250, all of the display data resulting from the conversion is transmitted to the target display system 22, the operating data whereof was taken into account during the conversion of the images generated by the source system.

In order to form and display a visual representation of an immersive environment in real time to an observer having a target immersive system, which is a copy of the visual representation of the immersive environment generated by the source system, the method involves circling back to the second step 240 after the third step 250.

The cycle with which circling back takes place in order to display a new representation of the virtual environment on the display system of the target system, the time of which cycle can be restricted by the computations performances of the digital processing systems of each of the source and target systems, as well as by the performances of the data transmission means through which the data is exchanged between said source and target systems, is repeated each time the target immersive system acquires operating data corresponding to a representation of the virtual environment on the source system.

Provided that it has not been paused by activation of the data freezing step 241, the computation is repeated, advantageously as quickly as the digital processing systems of the source and target systems allow, at least to provide an observer 91 with a perceived immersion that is consistent with the generation thereof by the source system, for example almost simultaneous with that of the user 90 of the source system when said source system is an immersive system.

As stated, the notion of observation conditions combines the notions of the position of observation and/or of the direction of observation. These positional and directional parameters can be deduced from measurements or analyses. For example, the direction of observation can be deduced from a measurement of the position of the two eyes of a user or of an observer.

Previously assumed or determined observation conditions can also be used for either the source system or a target immersive system, or for both, whereby the implementation of the method allows the displays to be adapted by taking into account differences between the two systems.

The present disclosure as described in the case of a source system 10 comprising a multi-screen display system 12 of the CAVE type and a single target immersive system 20 comprising a display system 22 with a single screen, is capable of comprising alternatives without leaving the principles of the present disclosure disclosed in detail in the example described.

Figure 3:
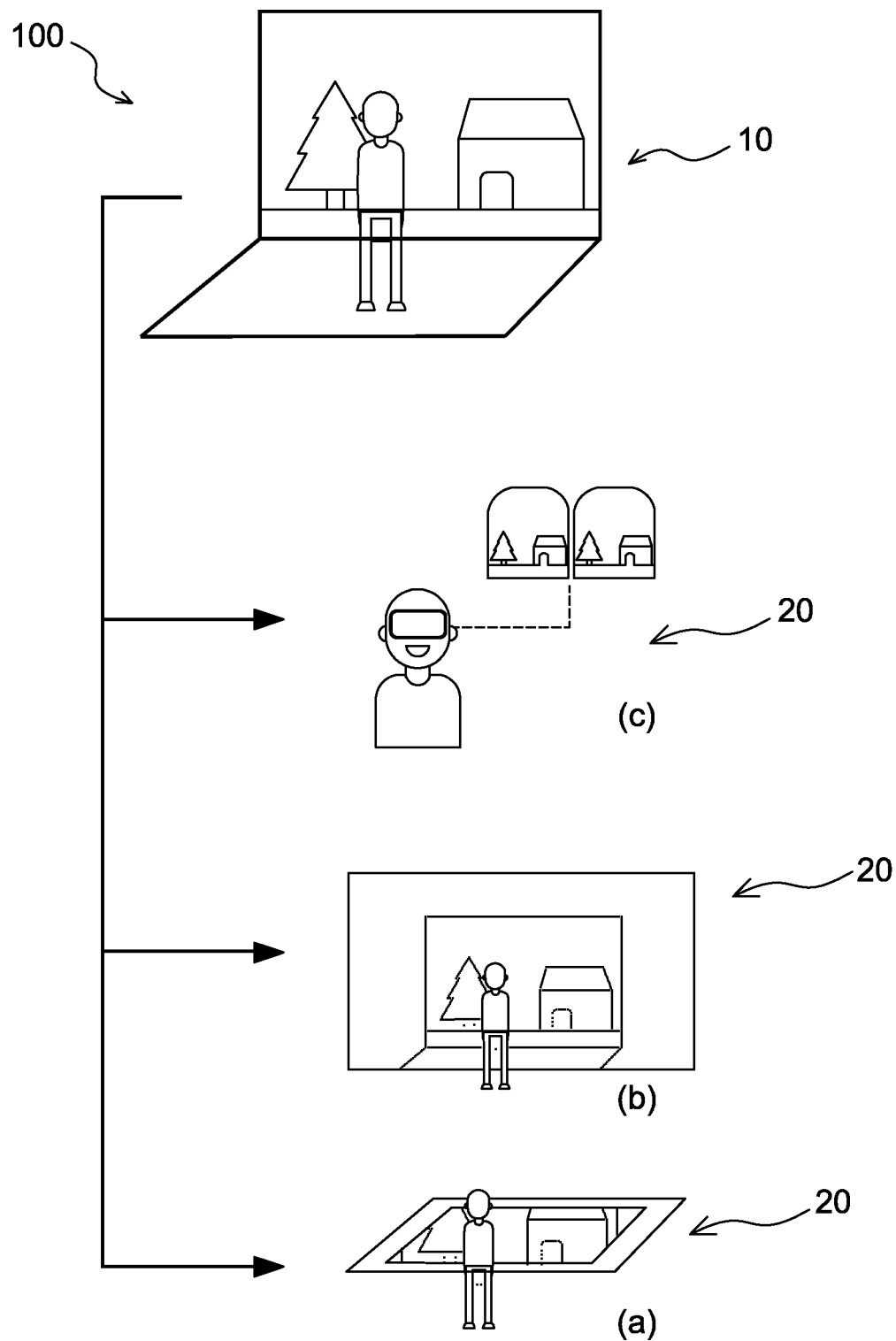
FIG. 3: an illustration of a device comprising a plurality of target immersive systems with display systems implementing different technologies and reproducing the virtual environment of the same source immersive system.

The device can comprise a source system and any number of target immersive systems, as illustrated in FIG. 3 of a device 100 comprising three target immersive systems 20 of different types, which can simultaneously reproduce an environment, even a virtual environment, generated by the source system in the target systems.

The present disclosure allows an immersion to be shared in numerous configurations of immersive systems, in particular of display systems of said immersive systems, FIG. 3 illustrating the possible configurations in a non-limiting manner.

In one embodiment, the source system and a target immersive system both comprise a multi-sided display system. Advantageously, the immersive systems have, in such a case, systems for measuring the position of the observation point and of the direction of observation of the user or of the observer.

In other embodiments, the source system comprises a multi-sided display system and a target system comprises a viewing system of the headset type.

The viewing systems of the headset type implement screens that are physically very close to the eyes of the headset user, but which are provided, in order to remain usable, with optical systems enabling collimation, which places a virtual image, in this case considered as defined in geometrical optics, of the surface of the screen at a sufficient distance from the eye. It is this virtual image that is thus considered to be the image displayed in the viewing system.

In a first mode of operation of this embodiment, the observer using the headset is placed in the virtual environment containing the source system reproduced at exactly the same position and in the same orientation as those of the user of the source system in the source system. In an alternative embodiment, only the source orientation about the axis defined by the centre of the two eyes is not taken into account to give a little more freedom to the observer. Advantageously, in this mode, the observer in the target system views exactly what is being viewed by the user of the source system.

In a second mode of operation of this embodiment, the observer using the headset is placed in the virtual environment containing the source system reproduced at exactly the same position as that of the user of the source system in the source system. Advantageously, in this mode, the observer in the target immersive system can look in other directions different from that of the user of the source system.

In other embodiments, the source system comprises a display system of the headset type.

The configuration information thus includes a description of the reverse geometric transformation to the geometric transformation associated with the pixels of the images intended for each of the two eyes in addition to the field of view associated with the headset.

The target immersive system receives the display data directly acquired by the acquisition system and applies the geometric transformation described in the configuration information thereto in order to recover flattened images intended for the left eye and for the right eye, without the optical deformations often required for displaying in this type of immersive system of the headset type.

In one associated embodiment, the source immersive system is of the headset type and the target immersive system is also of the headset type. The conversion carried out by the target system consists of placing a moving window about the observer in the target system, in a virtual environment, in which window the content is displayed, said content originating from the source system, the size of the window being a function of the features of the source system so as to at least correspond to the field of view rendered by said source system.

In a first mode of operation, the window is displayed constantly in the observer's field of view, thus imposing that the position and orientation of said observer in the virtual environment correspond exactly to the position and orientation of the user of the source system in the source system.

In yet another mode of operation, only the position of the observer in the target system is restricted in the virtual environment. The observer can orient his/her look in any of the directions, even if he/she only perceives the content viewed by the user of the source system when the directions in which they are both looking are sufficiently close to one another.

The source system does not necessarily comprise a source display system, insofar as the operating data comprises all of the observation conditions data associated with the display data of said operating data.

In order to assist the observer of a target immersive system in choosing a direction of observation in a virtual environment, and in the visual perception that he/she has of the virtual environment, all of the representation conditions whereof he/she does not have full control over, symbolic representations are advantageously superimposed over the visual representation of the virtual environment shown on the target immersive system to provide the observer with an orientation aid and aid in selecting a direction of observation.

These symbolic representations comprise, for example, the graphical materialisation of a sphere or of a grid associated with the representation of horizontal surfaces, for example a floor, and/or vertical surfaces, for example a wall.

Such symbolic representations, which can possibly be materialised solely on a temporary basis, for example when instructed by the observer, or under certain conditions, for example in the case of a fast evolution in the observation conditions of the source system, assist the observer for easier selection of the direction of observation and for locating his/her position in the virtual scene.

Such graphical elements incorporated into the field of view of the observer will show the latter in which direction he/she must look to retrieve the image viewed by the user of the source system, i.e. how to look in the same direction.

In an alternative to these embodiments, the display data of prior images displayed in the virtual environment of said observer can take time to disappear, thus allowing the content currently viewed according to the current direction in which said user is looking to be superimposed in his/her field of view, with the prior content viewed in the previous directions in which said user was looking. If said observer is not looking in exactly the same direction as said user, he/she could thus perceive a larger portion of the virtual environment viewed by said user.

In another associated embodiment, the source system is of the headset type and the target system is a conventional flat screen, possibly stereoscopic. Advantageously, in this embodiment in particular, the conversion of the display data originating from said headset as a function of the position data and/or orientation originating from said headset allows the portion of content of the virtual environment visible through the display system of the source system to be positioned in the virtual environment of the target system in a stabilised manner, thus reducing the impact of the frequent head movements of the user of the source system.

Advantageously, a processing operation allowing such stabilisation can be implemented regardless of the source and target systems used, and is mainly beneficial if the source system has means for measuring the orientation of the observation point.

In one mode of operation of this embodiment, the window of the virtual environment of the target immersive system, in which the image corresponding to the visible source virtual environment portion is displayed, is positioned on a geometric shape similar to a fixed and invisible sphere centred on the head of the observer, the position whereof at the surface of the sphere is a function of the direction in which the user of the source system is looking, whereby said function can be linear or otherwise. In order to overcome the absence of a positioning system on a conventional screen, the sphere can rotate about itself in order to track the look of the user of the source immersive system when this user is looking in a direction that is initially situated outside of the field of the target display system.

Advantageously, such a mode of operation gives the observers of the target system the feeling that the source virtual environment is revealed progressively as the user of the source system looks in different directions, in the manner of a torch that would only light the part of the environment towards which it is pointed at any one time.

By extension from the embodiments described above, the source immersive system can also be an augmented reality viewing headset, in which case the environment taken into account by the acquisition means of said source system is a combination of the virtual displays and of the images of the real scene, both of which are superimposed.

In one embodiment, the display means of the source immersive system are virtual, whereby the challenge involves the computing of the content to be displayed on a target immersive system by the digital processing means of the source immersive system without being concerned with displaying the information on the display system of the source immersive system. Advantageously, the source immersive system can use the position and orientation of the observer in the target immersive system as the position and orientation for the computation of the display data, which position and orientation of the observer in the target immersive system are transmitted to said source system via the network connection means.

In one mode of operation of this embodiment, the source system generates a non-dimensional image consisting of a 360° projection of the virtual environment, resulting in an image or a set of images that can be converted by the target immersive system, while taking into account the difference between the observation conditions used by the source system and the effective observation conditions of the observer in the target immersive system at the time the image is displayed.

In another mode of operation of this embodiment, the source system computes a set of display data corresponding to the geometric configuration of the display system of the target immersive system. The conversions carried out by the target immersive system take into account the discrepancy between the position used by the source system and the effective position of the observer in the target immersive system at the time the image is displayed.

Although the present disclosure has been disclosed in a detailed manner in the case of the implementation of display systems using flat rectangular or square screens, an immersive system comprising other shapes of screens can be implemented in the device and in the method both as a source system and as a target system.

For example, one or more curved screens can be implemented in a display system. In such a case, according to the present disclosure, the necessary conversions are carried out while taking into account the features of the curve of the surface on which, in the case of the source system, an image is displayed, and in the case of the target system, an image is to be displayed. The present disclosure can, in particular in this situation, adapt an image to a different curve between a screen of the source system and a screen of the target system, since the processing system associated with the target system has all of the geometric information associated with the source system for virtually constructing exactly the same screen with the same curves.

In one embodiment, independently from the type of system implemented as a source system, the display system of a target immersive system comprises a single conventional flat screen having, if necessary, stereoscopic display capacities.

Such an embodiment allows a plurality of spectators to experience, via immersion in the target system, an experience of the user immersed in the source system. In one mode of operation of this embodiment, the position and orientation of observation of the user of the target system are assumed such that they correspond to the default position and orientation in the target system.

In one alternative embodiment on a model similar to the previous embodiment, the display system of the target system is a mobile or transportable device such as a tablet, smartphone or laptop computer.

In one additional mode of operation applicable to the previous embodiments, the display system and/or the processing system of the target immersive system and/or of the source system are associated with equipment, generally combining hardware and software, implemented so as to interact with the visual representations on the display system, which will be jointly referred to as the "interaction means". These interaction means can take on any form provided that they allow the content and/or the behaviour of the images to be influenced via the display system and/or the processing system. These interaction means comprise, for example in a non-exhaustive manner, terminals with direct or indirect tactile capacities, a keypad, a pointer such as a mouse or a trackball, digital pens, a 3D pointing device, a gyroscopic pointing device, or eye tracking systems, etc. The function for freezing the display data on the target system can thus be activated thanks to these interaction means and the one or more observers on the target system can use the interaction means of said target system to point and/or annotate, with text and/or with drawings and/or with symbols, on the surface of the frozen image, then record these annotated images via a suitable interface.

Such possibilities for interactions, pointing operations and annotations are advantageously implemented on each of the source and target systems such that the user on the source system and the observer on the target immersive system can use the capacities thereof.

In one embodiment, the pointing operations and annotations carried out on a target or source system are also transmitted by the communication means in a digital data format to the other or to a plurality of other interconnected target immersive systems such that the pointing operations and annotations, carried out by an observer or by the user, can be inlaid in the visual representations displayed on each of the other immersive systems concerned.

In order to simplify the systems and prevent the need to implement a device for measuring the position of the head and eyes of a user or of an observer, these parameters can be estimated as functions of measurements or of observations that are more or less accurate, yet sufficient for obtaining a reconstruction of the image of the immersive environment that is acceptable to the observer.

For example, the target system can be a smartphone, the screen whereof forms the display system and a camera whereof on the front face of said smartphone tracks, via a dedicated software application, the position of the head or eyes of the observer.

In all cases, as understood from the detailed description of one embodiment, the parameters of the source and target observation conditions are required in order to formulate the conversions of the images of the source system into consistent images on the target system. According to whether one or the other of the source or target systems, or both thereof, are equipped or not with a system for determining the variable values of the parameters regarding the observation conditions, the values of the parameter are taken into account or, in the absence thereof, assumed values are taken into account as a function of the display means and observation conditions.

For example, the display system of the target immersive system can be a screen associated with tactile capacities such as interaction means. The observer can thus use these interaction means to change the position and/or direction of observation parameters and thus dynamically determine a position and/or a direction of observation according to which he/she observes the virtual representation of the source immersive environment. The tactile capacities can be replaced by a mouse-type device. The 2D or 3D display control using these interaction means is well known to one of ordinary skill in the art. The interaction means of the target immersive system thus allow the observer to control a subset of the observation conditions for the target immersive system.

Advantageously, according to the present disclosure, all types of immersive systems described can be combined in a more or less complex device which is not restricted to a single source system/target system pairing.

The present disclosure can also apply to different types of virtual environments. The virtual environment can be a three-dimensional environment.

The virtual environment can also be a two-dimensional environment represented by still or moving, stereoscopic or non-stereoscopic images.

In the case of stereoscopic images, knowledge of the properties of the image capture appliance can allow the correct proportions to be reproduced for the observer on the target system.

Thus, according to the device and method of the present disclosure, the reproduction of an environment generated on a source system in one or a plurality of target immersive systems is obtained, without the necessary transmission of information other than that corresponding to the configuration data and operating data generated by the source system.

Despite the differences between the target immersive system and the source system, the environment perceived by a user of the source system is reproduced in a manner that is consistent with regards to an observer of the target system, who thus benefits from the immersion experience in the virtual environment of the source system.

This result is obtained with minimum requirements in terms of data transmission and in terms of the cost of adapting existing systems.

What is claimed is:

1. A device for sharing an immersion in a virtual environment, comprising:
   a source immersive system comprising a source display system, said source immersive system delivering operating data for a visual representation of the virtual environment, said operating data comprising display data generated at said source immersive system and corresponding to images of said visual representation displayed on the source display system of said source immersive system and said operating data further comprising observation conditions including an observation position and facing direction of a head of a user under which the visual representation of the virtual environment was generated;
   at least one target immersive system, comprising a digital processing system delivering images to at least one display system of said target immersive system;
   said device being characterised in that it comprises:
      means for transmitting the operating data delivered by the source immersive system to the at least one target immersive system;
      means for converting the display data generated at said source immersive system, representative of images of the visual representation of the virtual environment delivered by the source immersive system associated with data on the observation conditions, in order to build images displayed in the at least one display system of the target immersive system, such that the set of images displayed by said at least one display system of said target immersive system is the result of processing operations that enhance the immersion on said target immersive system in the display data upon passage from the observation conditions transmitted by the source immersive system to effective observation conditions in the at least one display system of said target immersive system;
      said enhancement of the immersion including compensation of visual deformations resulting from one of processing of the source immersive system generated display data on different display systems and/or according to different observation conditions; and
      the display data conversion effects reconstructing a virtual source environment, which is a virtual reconstruction of the physical environment of the source display system, and forcing an observation point of an observer in the at least one display system of the target immersive system to take a coincident position in the virtual source environment as an observation point of a user in the source display system, while allowing the observer in the at least one display system of the target immersive system to choose a different observation orientation,
   wherein software for partial processing of display data is executed on a digital processing system of the source immersive system, or on an ancillary computer connected to a network via which data is transmitted between the source immersive system and the at least one target immersive system, said software converting the display data delivered by said source immersive system, representative of images of the visual representation of the virtual environment of said source immersive system, into display data corresponding to non-dimensional images that are independent of a structure of a viewing system that is to display the images, said display data corresponding to non-dimensional images being transmitted to the at least one target immersive system,
   wherein the non-dimensional images correspond to images projected onto an inner wall of a sphere, at the centre of which sphere an observation point of the source immersive system is placed, in order to form non-dimensional images in a solid angle corresponding to the images of the display data of the source immersive system, capable of reaching four Pi steradians.

2. The device according to claim 1, wherein the conversion of the display data comprises a reconstruction of a 3D virtual representation of the source display system of the physical environment of the source display system, a position of the observation point of the observer in the at least one display system of the target system being forced, for the conversion of the display data, to take the same position in said 3D virtual representation of said source display system as the position of observation of the user in the source display system.

3. The device according to claim 1, wherein the source immersive system comprises a measuring system for measuring, in real time, the direction of observation, and/or the position of observation, in the source display system of the source immersive system, of the user that would be immersed in the virtual environment of said source immersive system, and the at least one target immersive system comprises a measuring system for measuring the direction of observation, respectively and/or the position of observation, in the at least one display system of said target immersive system, of the observer that would be immersed in the virtual environment displayed on said target immersive system.

4. The device according to claim 1, wherein the conversion of the display data originating from the source immersive system as a function of the position data and/or orientation of said target system allows the content of the virtual environment visible through the source display system of the source immersive system to be positioned in the virtual environment of the target immersive system in a stabilised manner.

5. The device according to claim 1, wherein the display data processing software for building images displayed by the at least one display system of the at least one target immersive system is executed on computing means of said target immersive system.

6. The device according to claim 1, wherein the source immersive system comprises equipment for acquiring a signal carrying display data, generated by the source immersive system, and which transmits, in a digital data format, said display data corresponding to the signal acquired, directly or indirectly, to the at least one target immersive system.

7. The device according to claim 1, wherein the source immersive system comprises software, executed on a digital processing system, for acquiring content of the display data of said source immersive system, after the display data has been computed, and which transmits, in a digital data format, said content of the display data acquired, directly or indirectly, to the at least one target immersive system.

8. The device according to claim 1, comprising a data recording system configured to record the operating data generated by the source immersive system and for transmitting said operating data to at least one target immersive system in delayed time.

9. The device according to claim 1, wherein:
the source immersive system further comprises image processing software and a source display system;
at least one target immersive system further comprises software for image synthesis and for generating a visual representation of a virtual environment in the form of images displayed on one or more screens of the at least one display system of said target immersive system, and comprises equipment and/or software for acquiring the display data corresponding to the images displayed on the at least one display system of said target immersive system,
such that each of said immersive systems can alternate between being a source immersive system and a target system.

10. The device according to claim 1, wherein a display system and a digital processing system of at least one target immersive system and/or of the source immersive system are associated with interaction means configured such that they modify, via the display system and/or the processing system of the given target immersive system or source immersive system, the content and/or the behaviour of the images displayed by the display system of said source immersive system or of the given target immersive system.

11. The device according to claim 10, wherein the interaction means comprise a freeze command for selectively activating and deactivating the freezing of all or part of the display data and/or of the observation conditions used to generate the images to be displayed by the display system of the source immersive system and/or of the target immersive system.

12. The device according to claim 11, wherein the interaction means of the target immersive system comprise a freeze command for freezing a subset of observation conditions in the display system of the source immersive system and/or in the display system of the target immersive system.

13. The device according to claim 10, wherein the interaction means of at least one target immersive system are moreover configured for pointer use and/or for the annotation of the images displayed by the display system of said target immersive system.

14. The device according to claim 13, wherein data characterising the pointing operations or annotations formed on images of the target immersive system are transmitted via transmission means to the source immersive system and/or to at least one other connected immersive system.

15. The device according to claim 10, wherein the interaction means comprise one or more touch-sensitive surfaces or surfaces that are sensitive to the presence of a hand or finger, and/or one or more pointers.

16. The device according to claim 1, wherein the source display system of the source immersive system, and the at least one display system of the at least one target immersive system, each belong to one of the categories implementing flat screens and/or curved screens from the group: multi-sided display systems; virtual reality, augmented reality or mixed viewing headsets; multi-screen display systems; screens; screens carried by a user or observer.

17. The device according to claim 1, wherein at least one target immersive system is situated in a location that is remote from the source immersive system, the physical separation of the two systems being such that the user of said source immersive system and the observer of said target immersive system are not capable of communicating with one another without using technical communication means.

18. The device according to claim 1, wherein at least one target immersive system is situated in the vicinity of the source immersive system, the physical separation being such that the user of said source immersive system and the observer of said target immersive system can communicate directly with one another without any physical barrier.

19. A method for sharing an immersion in a virtual environment of an observer in a target immersive system, comprising the steps of:
generating, independently from the target immersive system, operating data for a visual representation of the virtual environment, said operating data comprising display data corresponding to images of said visual representation and comprising observation conditions including an observation position and facing direction of a head of a user ( ) associated with said display data;

displaying, on a display system of the target immersive system, images representing the virtual environment;

characterised in that said method comprises, for each image or set of images to be displayed, between the generation step and the display step, a conversion step, carried out at least partially on the target immersive system, for converting the display data of the virtual environment generated in the generation step independently from the target immersive system, said conversion step comprising the determination of the effective observation conditions of the observer in the display system of said target immersive system and the conversion of the display data associated with the observation conditions of the display data generation step, into display data corresponding to said effective observation conditions of the observer;

forcing an observation point of the observer in the display system of the target immersive system to take a coincident position in the virtual environment as an observation point of the user associated with said display data, while allowing the observer in the display system of the target immersive system to choose a different observation orientation; and enhancing the immersion by compensating for visual deformations resulting from one of processing of the display data on different display systems and/or according to different observation conditions, wherein software for partial processing of display data is executed on a digital processing system of a source immersive system, or on an ancillary computer connected to a network via which data is transmitted between the source immersive system and the at least one target immersive system, said software converting the display data delivered by said source immersive system, representative of images of visual representation of the virtual environment of said source immersive system, into display data corresponding to non-dimensional images that are independent of a structure of a viewing system that is to display the images, said display data corresponding to non-dimensional images being transmitted to the at least one target immersive system, wherein the non-dimensional images correspond to images projected onto an inner wall of a sphere, at the centre of which sphere an observation point of the source immersive system is placed, in order to form non-dimensional images in a solid angle corresponding to the images of the display data of the source immersive system, capable of reaching four Pi steradians.

20. The method according to claim 19, wherein each image point of an image converted in the conversion step for display by the display system of the target immersive system, is determined as a function of at least one effective observation point in the display system of the target immersive system in order to preserve, to within a constant proportionality factor for the entire image at a given moment in time, a same relative direction of observation relative to any other image point of said converted image, observed from said effective observation point, as the relative direction between said image points in the display data of the visual representation of the virtual environment generated in the generation step, delivered by a source immersive system and comprising the image data and the data on the observation conditions associated with said image data.

21. The method according to claim 19, wherein the generating step for generating the display data of the representation of the virtual environment is carried out on a source immersive system, which source immersive system is: an image generation system for a virtual display, a system for broadcasting a stream of real or virtual images generated in real time or recorded, or an immersive system in which a user is immersed.

22. The method according to claim 21, wherein the conversion step comprises a reconstruction of a 3D virtual representation of the source display system of a physical environment of a source display system of the source immersive system.

23. The method according to claim 19, wherein the conversion step for converting display data is carried out entirely on the target immersive system after a step of transmitting the display data of the representation of the virtual environment to said target immersive system, said data having been generated in the generation step.

24. The method according to claim 19, wherein the generation step comprises a display data partial conversion step, before a step of transmitting the partially converted display data to the target immersive system, in which partial conversion step the display data is converted without being dependent on variable data of the display conditions in the target immersive system.

25. The method according to claim 19, wherein the conversion step comprises a freezing step for freezing the display data of the representation of the virtual environment or for freezing the observation conditions, generated during the generation step.

26. The method according to claim 25, wherein the data of the observation conditions in the display system of the target immersive system continue to be taken into account during the display data freezing or observation conditions freezing step.

27. The method according to claim 19, comprising an initialisation step in which the target immersive system initialises a register comprising data on conditions under which the display data is generated during the generation step.

* * * * *